(12) United States Patent  
Gonikberg

(10) Patent No.: US 9,125,165 B2  
(45) Date of Patent: Sep. 1, 2015

(54) WLAN-BASED POSITIONING SYSTEM

(75) Inventor: Mark Gonikberg, Los Altos Hills, CA (US)

(73) Assignee: Broadcom Corporation, Irvine, CA (US)

( * ) Notice: Subject to any disclaimer, the term of this patent is extended or adjusted under 35 U.S.C. 154(b) by 47 days.

(21) Appl. No.: 13/194,658

(22) Filed: Jul. 29, 2011

(65) Prior Publication Data

US 2013/0028246 A1 Jan. 31, 2013

(51) Int. Cl.
*H04W 64/00* (2009.01)
*G01S 5/02* (2010.01)
*G01S 19/47* (2010.01)

(52) U.S. Cl.
CPC .............. *H04W 64/00* (2013.01); *G01S 5/0252* (2013.01); *G01S 19/47* (2013.01)

(58) Field of Classification Search
USPC .............. 370/328–338, 252; 455/41.2, 67.11, 455/517, 556.1, 456.1, 456.5; 340/988
See application file for complete search history.

(56) References Cited

U.S. PATENT DOCUMENTS

| | | | |
|---|---|---|---|
| 6,393,294 B1 * | 5/2002 | Perez-Breva et al. ...... | 455/456.5 |
| 6,680,675 B1 * | 1/2004 | Suzuki .......................... | 340/988 |
| 7,233,800 B2 * | 6/2007 | Laroia et al. ................. | 455/456.1 |
| 7,456,596 B2 * | 11/2008 | Goodall et al. ........... | 318/568.12 |
| 2007/0026807 A1 * | 2/2007 | Kish ............................. | 455/63.4 |
| 2007/0042716 A1 * | 2/2007 | Goodall et al. ............. | 455/67.11 |
| 2007/0121560 A1 * | 5/2007 | Edge ............................ | 370/338 |
| 2007/0242643 A1 * | 10/2007 | Chandra et al. ............. | 370/338 |
| 2008/0280624 A1 | 11/2008 | Wrappe | |
| 2010/0094683 A1 * | 4/2010 | Symons et al. .................. | 705/10 |
| 2010/0298008 A1 | 11/2010 | Burroughs | |
| 2010/0302102 A1 * | 12/2010 | Desai et al. .................... | 342/417 |
| 2011/0110293 A1 * | 5/2011 | Hart et al. ...................... | 370/328 |
| 2011/0117924 A1 * | 5/2011 | Brunner et al. ............ | 455/456.1 |
| 2011/0176434 A1 * | 7/2011 | Pandey et al. .................. | 370/252 |
| 2012/0094683 A1 * | 4/2012 | Yoeli .......................... | 455/456.1 |

FOREIGN PATENT DOCUMENTS

| | | |
|---|---|---|
| CN | 101346638 A | 1/2009 |
| EP | 1329737 A2 | 7/2003 |
| EP | 1912454 A1 | 4/2008 |
| EP | 2059060 A2 | 5/2009 |
| WO | 2004004377 A1 | 1/2004 |

OTHER PUBLICATIONS

European Patent Office; European Search Report; EP Application No. 12005042.2; Oct. 1, 2013; 4 pages.

\* cited by examiner

*Primary Examiner* — Vincelas Louis
(74) *Attorney, Agent, or Firm* — Garlick & Markison; Bruce E. Garlick

(57) ABSTRACT

A technique to provide a WLAN-based positioning system to determine a location of a mobile wireless receiving device. A single access point is used to generate a plurality of beacons, in which each beacon of the plurality of beacons has a unique identifier. Each beacon is then transmitted in a different direction from other beacons. When the receiving device receives at least one of the transmitted beacons, signal strength or some other signal parameter is obtained from the at least one received beacon. The received signal parameter is used to determine the location of the mobile receiving device.

20 Claims, 4 Drawing Sheets

WLAN-BASED POSITIONING SYSTEM

BACKGROUND OF THE INVENTION

1. Technical Field of the Invention

The embodiments of the invention relate to wireless communications and, more particularly, to location positioning using wireless LAN technology.

2. Description of Related Art

Various communication devices utilize global positioning systems to determine accurate location of the device. Global Navigation Satellite Systems (GNSS) are the most well known systems in use today. Such GNSS systems include the Global Positioning System (GPS) in the United States, Galileo in the European Union and GLONASS in Russia. As illustrated in FIG. 1, GNSS systems rely on a plurality of satellites to triangulate the location. As shown in FIG. 1, a vehicle receives coordinated signals from a number of satellites and determines the timing of the arrival of the signals to triangulate the position.

Although GNSS systems may provide accurate positioning at the receiver end, the satellite communication link is line-of-sight, so that performance is compromised when the mobile receiver is indoors or in crowded urban environments (urban canyons). Accordingly, GNSS systems may not provide the desired performance to identify the location of the device, when significant obstruction exists between the positioning satellites and the device to triangulate the location of the device.

A different type of positioning system uses the wireless local area network (WLAN) technology to provide positioning information. WLAN-based positioning systems emerged as a way to augment GNSS in environments where satellite reception is problematic. However, WLAN-based systems are local and not global. FIG. 2 shows an example of a WLAN-based system that triangulates the position of a receiver. FIG. 2 illustrates a mobile person, who is in possession of the receiver. As shown in FIG. 2, three WiFi access points (APs) generate respective beacons with each's own identifier. That is, the mobile person can receive the beacons from the surrounding WiFi APs without requiring association. The receiver, by measuring the received signal strength from each AP, is able to estimate an approximate distance from each AP to triangulate its position, when the user accesses a database that stores a list of measured signal strengths.

Although WiFi signals need not be line-of-sight, WiFi signals are impacted by multipath radio frequency (RF) propagation and other interferences encountered in the channel between a particular AP and the receiver. Increasing the density of the access points by utilizing more APs for triangulation improves the precision, but adds significant investment in equipment and infrastructure.

Accordingly, for a WLAN-based positioning system, there is a need for having a more robust scheme in which positioning may be determined.

DETAILED DESCRIPTION OF THE INVENTION

The embodiments of the present invention may be practiced in a variety of wireless communication devices that operate in a wireless network. The examples described herein pertain to devices that operate utilizing current WLAN-based technology, such as the 2.4 GHz or 5 GHz Bands that encompass current WiFi protocols, as well as developing WLAN-based technology, such as the newer 60 GHz standard in the 60 GHz band, being developed by the Wireless Gigabit Alliance (WiGig or WGA) and IEEE. However, the invention need not be limited to one particular WLAN technology and may be readily adapted for other frequencies, protocols and standards. For example, the invention may be readily adapted to utilize the Bluetooth™ protocol.

Figure 1:
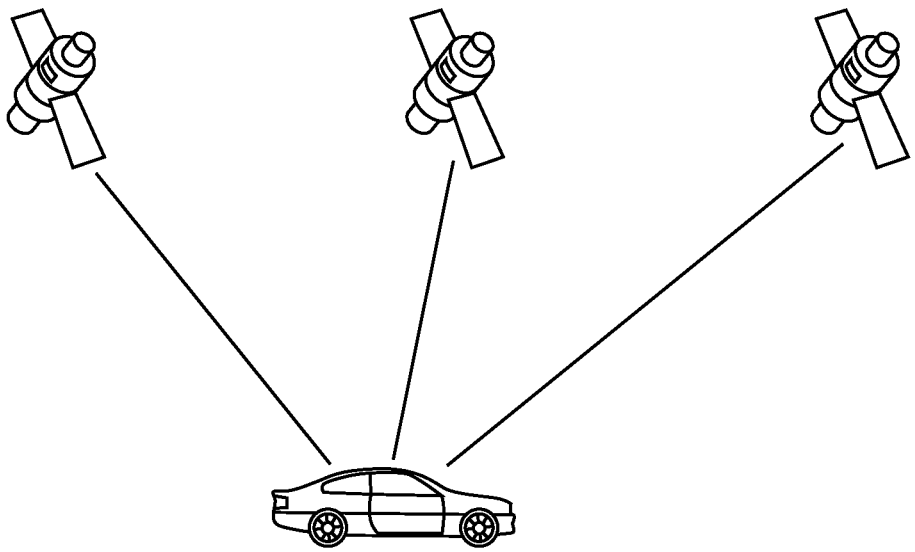
FIG. 1 illustrates a prior art technique of using multiple satellites to determine positioning.
Figure 2:
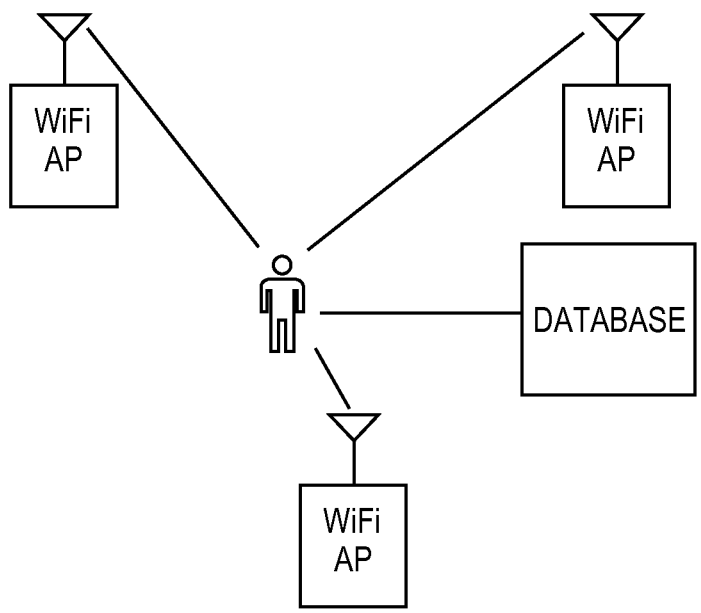
FIG. 2 illustrates a prior art technique of using multiple WiFi access points to determine positioning.
Figure 3:
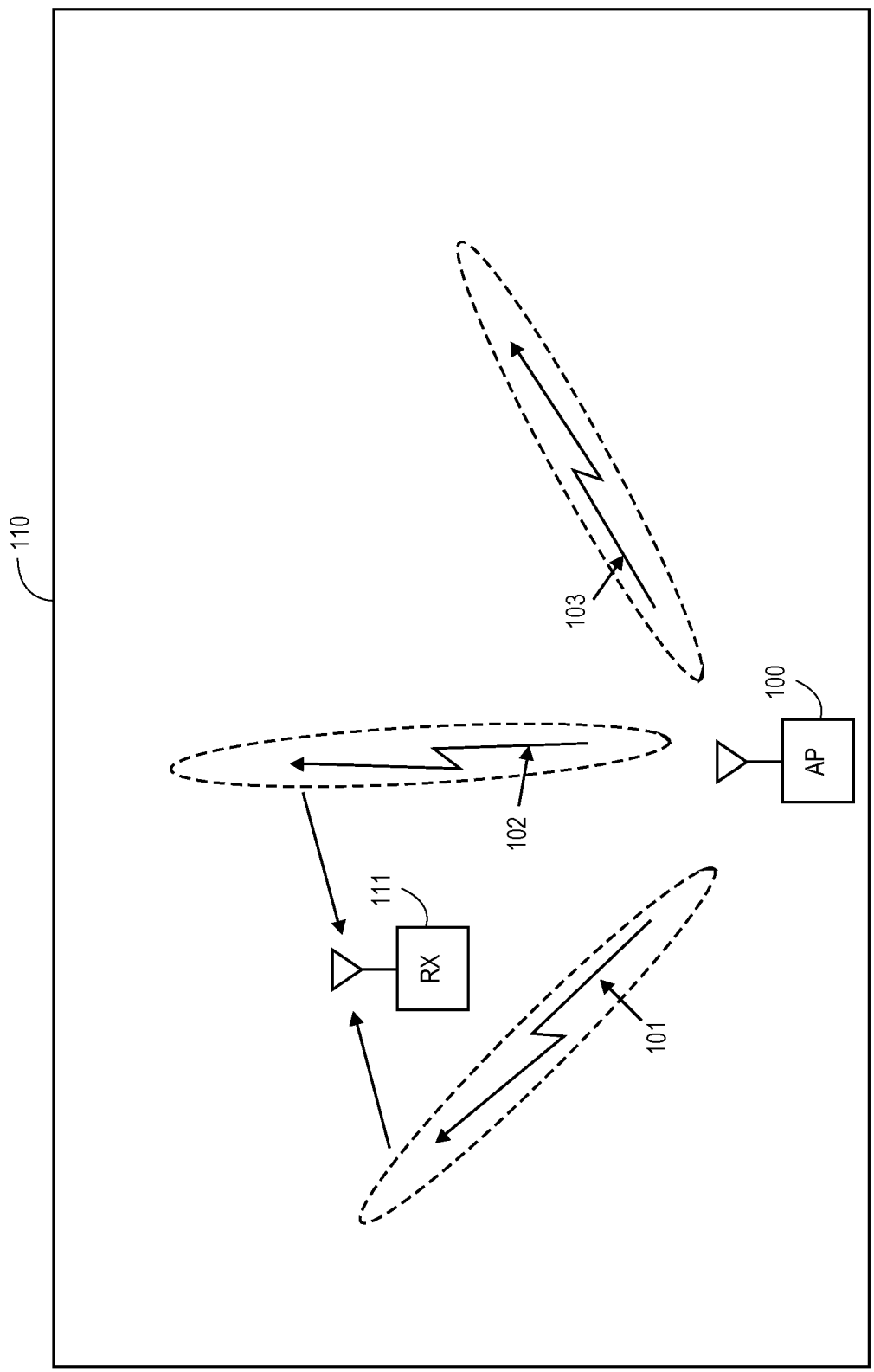
FIG. 3 illustrates one embodiment of the invention in which a single access point is used to determine positioning, wherein multiple beacons, each having a unique identifier, are transmitted in different directions.

FIG. 3 illustrates one example for practicing the invention. In FIG. 3, a single access point device (AP) 100 operates within boundary 110. Boundary 110 may be any boundary that determines a bounded area. For example, boundary 110 may represent a building, warehouse, portion of a urban landscape, sports arena or stadium, amusement park, etc. AP 100 is a single access point for transmitting wireless signals, such as radio frequency signals (RF). In one embodiment, the wireless signals are WLAN signals utilizing 2.4 GHz or 5 GHz for WLAN transmissions, such as WiFi or 802.11 protocol signals. In other embodiments, the transmitted signals may be WLAN signals utilizing millimeter wave transmissions, such as the 60 GHz band transmissions developed by WiGig/IEEE. Still in other embodiments, the transmissions may utilize other frequency ranges or protocols, including Bluetooth™.

In practicing an embodiment of the invention, AP 100 is operable to transmit multiple beacons, with each beacon having a unique identifier. In one embodiment, each beacon may operate effectively as a separate virtual WLAN network. Access points in general operate to provide communication links to multiple stations within its network. The access point and the stations operate as a network, which is commonly referred to as a Basic Service Set (BSS). However, in this instance, AP 100 is operable to provide transmissions to support multiple beacons, each with a unique identifier. That is, the beacons with different identifiers may operate as plurality of virtual networks, wherein each virtual network effectively operates as a separate BSS with respective identification (ID). That is, AP 100 is operable to transmit a beacon signal having a particular SSID (Service Set Identification) with a particular MAC (Medial Access Control) address (virtual network #1) and a different beacon signal having a different SSID and different MAC address (virtual network #2). Likewise, AP 100 transmits a beacon signal having a different SSID and MAC address to mimic other virtual networks. Accordingly, in one embodiment, each of the beacons of AP 100 has a unique SSID and/or MAC address. It is to be noted that prior art techniques of providing SSID and/or MAC addresses may be utilized for each of the virtual network transmissions in some embodiments.

Furthermore, in transmitting the different beacons from AP 100, instead of utilizing omni-directional propagation of the transmitted signals, AP 100 utilizes directional propagation. Directional propagation using beamforming transmissions from AP 100 may be implemented by the utilization of directional antennas. In one embodiment, a plurality of antennas may be used in which a certain signal feed to the antennas provides for a particular propagation pattern from the antennas. In particular, each beacon may be directed in a certain direction to generate a directed propagation for the transmitted signal. This directed transmission may be in a narrow beam, commonly referred to as beamforming to transmit a beacon.

In another technique, directed transmissions may be obtained from an antenna having multiple radiators. For example, antenna arrays have multiple radiating elements, in which the radiating elements may be configured and signal fed to provide directivity in transmitting the WLAN signal.

It is to be noted that beamforming transmissions as utilized in the current 802.11n protocol, as well as the developing WiGig 60 GHz protocol (e.g. 802.11 ac protocol), may be readily adapted for use in generating directional beacon transmissions from AP 100. Furthermore, in some embodiments, AP 100 may also implement multiple-input-multiple-output (MIMO) transmissions.

As shown in FIG. 3, AP 100 generates multiple directional beacons using different directional propagation to transmit signals that are used to determine the position of a device (such as mobile receiving device 111) within boundary 110. Three directional beacons 101, 102, 103 are shown emanating from AP 100 in FIG. 3. The actual number of such directional beacons may vary from system to system. However, at least two directional beacons are to be generated from AP 100. Because each beacon is associated with a unique identifier, each beacon may contain different SSID and/or MAC addresses to distinguish and identify the particular beacon. As noted above directional beacons are directed and propagated using directional antennas or radiating elements.

In order to utilize AP 100 as a source for generating positioning signals, AP 100 is disposed near or within boundary 110 so that the propagation pattern of the beacons transmitted from AP 100 covers the area of boundary 110. Then a sequence of directional beacons are generated, in which each beacon contains a different SSID and/or MAC address and each beacon is beamed at a different direction from the other beacons. As noted above, at least two beacons are utilized. AP 100 cycles through a set of unique beacons within a predetermined period of time. Then, the cycle repeats. Typically, the cycling of a given beacon of AP 100 is specified by the communication protocol or standard employed for use by AP 100.

The transmitted beacons form a propagation pattern over the area of coverage. At certain locations multiple beacons may cover the locations. At other locations, the coverage may be obtained by just one beacon and the propagation effects of the other beacons may be none or have negligible effect. Thus, a propagation pattern based on the transmitted beacons may be mapped throughout the boundary 110. Because each beacon is identifiable due to the unique identification, a detailed mapping may be made throughout the boundary 110 based on the pattern created. In one embodiment, this propagated pattern of all the beacons may be obtained as or translated into receive signal strength (RSS) of each beacon at each location point throughout the boundary. RSS is used as the received signal parameter which is to be determined for each beacon. As noted above, some locations will measure RSS of multiple beacons, while others may register RSS of only one beacon.

For example, in one technique, a measurement device may be taken to various locations and RSS for each beacon measured and cataloged. The collected location mapping of RSS values for the area within boundary 110 may be stored in a database (DB) or some other form of information storage. Because of the unique direction transmitted for each uniquely identifiable beacon, a unique pattern mapping of all the transmitted beacons may be obtained at various locations, so that each location within boundary 110 has a unique received signal parameter (whether RSS or some other parameter is used) based on all the beacons. The collection of all of the unique location values is stored and later accessed to provide positioning information for a mobile receiver. It is to be noted that the detection of the transmitted pattern of the beacons need not be limited to measuring RSS. Other techniques for determining a signal parameter of the beacons may be used, including, time of arrival (TOA) of a beacon, time difference of arrival (TDOA), angle of arrival (AOA), or a combination thereof. As noted above, at least two directional beacons are used with AP100 for establishing the mapping pattern for location determination.

Accordingly, when positioning is to be determined for a mobile device, such as receiving device 111 within boundary 110, device 111 receives one or more beacon signals at a particular location. Depending on the number of directional beacons and the size of boundary 110, it is understood that device 111 may not receive all of the beacons. In some instances, it may just receive one beacon. However, at the particular location of the receiver, the beacon receive signal strength (or whatever other technique was used to map the propagation field for the boundary area) is measured for all the beacons and the measured value compared to the stored values corresponding to the propagation pattern in the database. Thus, the receiver uses at least one beacon to obtain the received signal parameter(s) (e.g. RSS, when RSS is the parameter measured) to decipher the pattern. A comparison is made to the closest corresponding value for the pattern previously measured for various locations and stored in the database to provide the position information for receiving device 111.

It is to be noted that in certain situations, device 111 may include the database information which provides the one-to-one relationship between location and measured signal parameter (such as RSS), so that device 111 may access its own database with the location information. In other instances, AP 100 may supply location assistance information in the beacons to assist device 111 locate its position. In this instance, device 111 need not maintain the location database within the device.

Furthermore, it is to be noted that FIG. 3 shows beacons sweeping in a planar direction. However, the beacons may be arranged to sweep in a three-dimensional direction, so that positioning information may include elevation as well.

Figure 4:
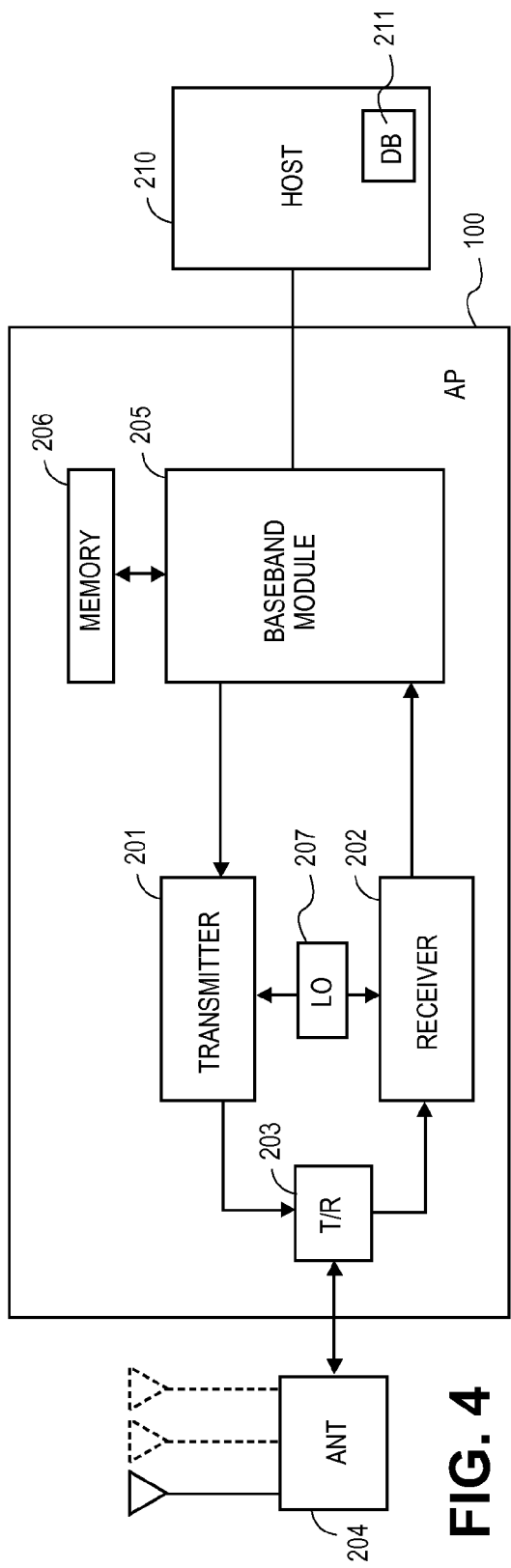
FIG. 4 is a schematic block diagram showing an example of a wireless communication device used as an access point device for practicing one embodiment of the present invention.

FIG. 4 shows a circuit that may be utilized as one embodiment for implementing AP 100. It is to be noted that various other circuits and devices may be utilized as well. FIG. 4 shows a schematic block diagram that includes a transmitter 201, receiver 202, local oscillator (LO) 207 and baseband module 205. Baseband module 205 provides baseband processing operations. In some embodiments, baseband module 205 is or includes a digital-signal-processor (DSP). Baseband module 205 is typically coupled to a host unit, applications processor or other unit(s) that provides operational processing for the device and/or interface with a user.

In FIG. 4, a host unit 210 is shown. Host unit 210 may be part of AP 100 or it may be a separate unit. For example, host 210 may represent the computing portion of the computer or application portion of an application processor. A memory 206 is shown coupled to baseband module 205, which memory 206 may be utilized to store data, as well as program instructions that operate on baseband module 205. Various types of memory devices may be utilized for memory 206. It is to be noted that memory 206 may be located anywhere within the device and, in one instance, it may also be part of baseband module 205.

Transmitter 201 and receiver 202 are coupled to a directional antenna 204 via transmit/receive (T/R) switch module 203. T/R switch module 203 switches the antenna between the transmitter and receiver depending on the mode of operation. As noted above, antenna 204 includes a plurality of antennas or plurality of antenna elements (such as an antenna array) in order to provide for directional beamforming transmissions.

Outbound data for transmission from host unit 210 are coupled to baseband module 205 and converted to baseband signals and then coupled to transmitter 201. Transmitter 201 converts the baseband signals to outbound radio frequency (RF) signals for transmission from AP 100 via antenna 204. Transmitter 201 may utilize one of a variety of up-conversion or modulation techniques to convert the outbound baseband signals to outbound RF signal. Generally, the conversion process is dependent on the particular communication standard or protocol being utilized.

In a similar manner, inbound RF signals are received by antenna 204 and coupled to receiver 202. Receiver 202 then converts the inbound RF signals to inbound baseband signals, which are then coupled to baseband module 205. Receiver 202 may utilize one of a variety of down-conversion or demodulation techniques to convert the inbound RF signals to inbound baseband signals. The inbound baseband signals are processed by baseband module 205 and inbound data is output from baseband module 205 to host unit 210.

LO 207 provides local oscillation signals for use by transmitter 201 for up-conversion and by receiver 202 for down-conversion. In some embodiments, separate LOs may be used for transmitter 201 and receiver 202. Although a variety of LO circuitry may be used, in some embodiments, a PLL is utilized to lock the LO to output a frequency stable LO signal based on a selected frequency.

It is to be noted that in one embodiment, baseband module 205, LO 207, transmitter 201 and receiver 202 are integrated on the same integrated circuit (IC) chip. Transmitter 201 and receiver 202 are typically referred to as the RF front-end. In other embodiments, one or more of these components may be on separate IC chips. Similarly, other components shown in FIG. 4 may be incorporated on the same IC chip, along with baseband module 205, LO 207, transmitter 201 and receiver 202. In some embodiments, the antenna 204 may also be incorporated on the same IC chip as well. Furthermore, with the advent of system-on-chip (SOC) integration, host devices, application processors and/or user interfaces, such as host unit 210, may be integrated on the same IC chip along with baseband module 205, transmitter 201 and receiver 202.

Additionally, although one transmitter 201 and one receiver 202 are shown, it is to be noted that other embodiments may utilize multiple transmitter units and receiver units, as well as multiple LOs. For example, multiple input and/or multiple output communications, such as multiple-input-multiple-output (MIMO) communication, may utilize multiple transmitters 201 and/or receivers 202 as part of the RF front-end. Furthermore, the database described above for storing the propagation patterns to cross-reference to a particular location is retained in database (DB) 211. Database 211 is shown as part of host 210, but in other embodiments, database 211 may be maintained elsewhere, either within AP 100 or external to AP 100.

As described above, baseband module 205 provides the SSIDs and/or MAC addresses that are coupled to one or more transmitter(s) 201 to be converted to separate beacon signals. The RF signal for each beacon transmission is sent to antenna 204, where antenna 204 directs each beacon to a particular direction based on the beacon's SSID and/or MAC address.

Figure 5:
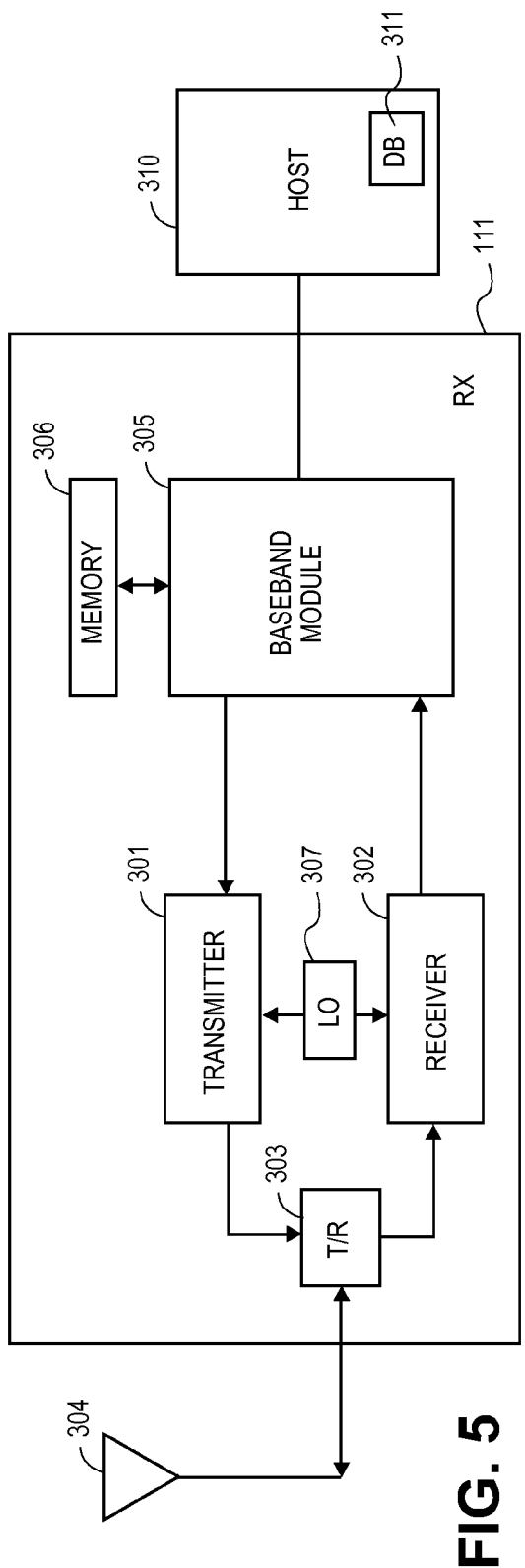
FIG. 5 is a schematic block diagram showing an example of a wireless communication device used as a receiving device for practicing one embodiment of the present invention.

Likewise, FIG. 5 shows a circuit that may be utilized as one embodiment for implementing mobile receiving device 111 of FIG. 3. It is to be noted that various other circuits and devices may be utilized as well. FIG. 5 shows a schematic block diagram that includes a transmitter 301, receiver 302, LO 307 and baseband module 305. Baseband module 305 provides baseband processing operations. In some embodiments, baseband module 305 is or includes a DSP. Baseband module 305 is typically coupled to a host unit, applications processor or other unit(s) that provides operational processing for the device and/or interface with a user.

In FIG. 5, a host unit 310 is shown. Host unit 310 may be part of device 111 or it may be a separate unit. For example, host 210 may represent the computing portion of the computer, application portion of an application processor and/or user interface portion of a mobile or handheld device. A memory 306 is shown coupled to baseband module 305, which memory 306 may be utilized to store data, as well as program instructions that operate on baseband module 305. Various types of memory devices may be utilized for memory 306. It is to be noted that memory 306 may located anywhere within the device and, in one instance, it may also be part of baseband module 305.

Transmitter 301 and receiver 302 are coupled to an antenna 304 via T/R switch module 303. T/R switch module 303 switches the antenna between the transmitter and receiver depending on the mode of operation. Antenna 304 may be a single antenna, multiple antennas, multiple antenna elements or an array to receive the directional beacons transmitted from AP 100.

Outbound data for transmission from host unit 310 are coupled to baseband module 305 and converted to baseband signals and then coupled to transmitter 301. Transmitter 301 converts the baseband signals to outbound RF signals for transmission from antenna 304. Transmitter 301 may utilize one of a variety of up-conversion or modulation techniques to convert the outbound baseband signals to outbound RF signal. Generally, the conversion process is dependent on the particular communication standard or protocol being utilized.

In a similar manner, inbound RF signals are received by antenna 304 and coupled to receiver 302. Receiver 302 then converts the inbound RF signals to inbound baseband signals, which are then coupled to baseband module 305. Receiver 302 may utilize one of a variety of down-conversion or demodulation techniques to convert the inbound RF signals to inbound baseband signals. The inbound baseband signals are processed by baseband module 305 and inbound data is output from baseband module 305 to host unit 310. Receiver 302 also includes circuitry for receiving the plurality of directional beacons from AP 100 and provide measurements of certain propagation parameters, such as RSS, used for providing the positioning information in device 111. This information is then coupled to baseband module 305 and decoded to determine the positioning information.

LO 307 provides local oscillation signals for use by transmitter 301 for up-conversion and by receiver 302 for down-conversion. In some embodiments, separate LOs may be used for transmitter 301 and receiver 302. Although a variety of LO circuitry may be used, in some embodiments, a PLL is utilized to lock the LO to output a frequency stable LO signal based on a selected frequency.

It is to be noted that in one embodiment, baseband module 305, LO 307, transmitter 301 and receiver 302 are integrated on the same IC chip. In other embodiments, one or more of these components may be on separate IC chips. Similarly, other components shown in FIG. 5 may be incorporated on the same IC chip, along with baseband module 305, LO 307, transmitter 301 and receiver 302. In some embodiments, the antenna 304 may also be incorporated on the same IC chip as well. Furthermore, with the advent of SOC integration, host devices, application processors and/or user interfaces, such as host unit 310, may be integrated on the same IC chip along with baseband module 305, transmitter 301 and receiver 302.

Additionally, although one transmitter 301 and one receiver 302 are shown, it is to be noted that other embodiments may utilize multiple transmitter units and receiver units, as well as multiple LOs. For example, multiple input and/or multiple output communications, such as multiple-input-multiple-output (MIMO) communication, may utilize multiple transmitters 301 and/or receivers 302 as part of the RF front-end. Furthermore, the database described above for storing the propagation patterns to cross-reference to a particular location may be retained in database 311. Database 311 is shown as part of host 310, but in other embodiments, database 311 may be maintained elsewhere. If the AP is supplying the location assistance information, database 311 would not be needed and would not be present in some embodiments.

Figure 6:
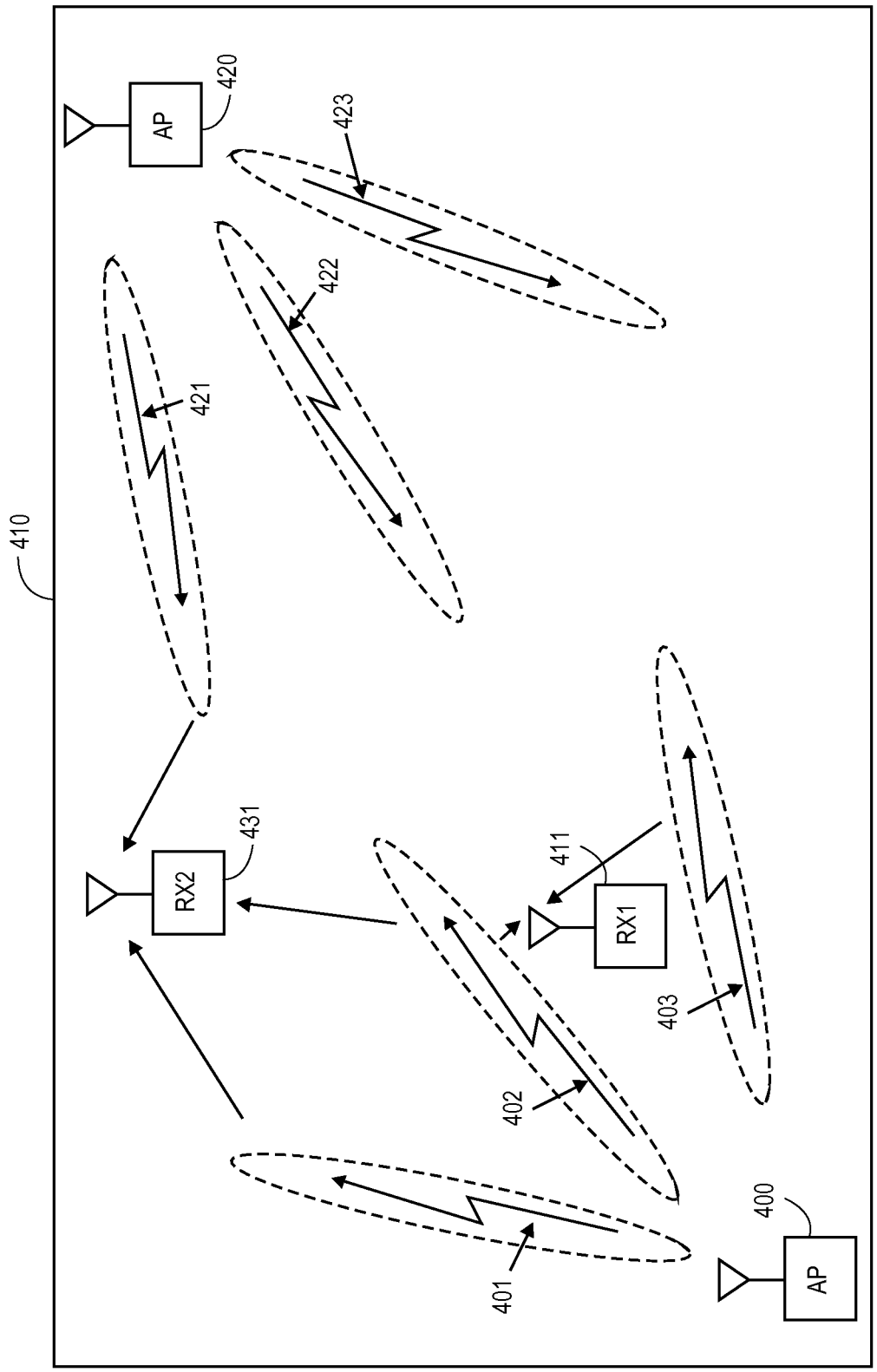
FIG. 6 illustrates an alternative embodiment of the invention in which multiple access points are used, wherein each access points operates equivalently to the single access point shown in FIG. 3.

FIG. 6 illustrates an alternative embodiment of the invention for providing WLAN-based positioning system. In FIG. 6, boundary 410 encloses an area, similar to the area enclosed by boundary 110 in FIG. 3. Instead of operating with only a single AP, multiple APs are utilized within boundary 410. The example embodiment in FIG. 4 shows two APs 400 and 420, but other systems may use more APs. Each AP 400, 420 operate equivalently to AP 100 of FIG. 3 in generating a plurality of directional WLAN beacons in different directions, in which each directional beacon carries a unique SSID and/or MAC address. Again, three beacons are shown for each AP (beacons 401-403 for AP 400 and beacons 421-423 for AP 420), but there may be more beacons in other embodiments. At least two directional beacons are generated from each AP 400, 420. Multiple APs are utilized in situations where one AP may not provide adequate coverage over the entire area. For example, in a large warehouse, sports arena or stadium, or even in an urban (e.g. city) location, one AP may not cover the entire area where coverage is desired. Thus, multiple APs may be used.

When mapping the propagation coverage of the beacons at various locations for one-to-one mapping of the propagation field to the locations, beacons from multiple APs are to be considered Likewise, when a receiving device is in a certain location, it too must take into account the beacons from multiple APs. Thus, for example, receiving device 411 may be in a location where only one beacon or beacons from AP 400 are encountered, but receiving device 431 may be in a location where coverage is obtained from receiving beacons from multiple APs. Multiple APs do complicate the reception and analysis of the propagation pattern, but allow for extended boundary area to be covered.

Accordingly, a WLAN-based positioning system is described. By utilizing directional beacons, in which each beacon carries unique SSID and or MAC addresses, a single access point device effectively operates as though multiple access point devices are present to provide positioning information to a mobile device.

As may be used herein, the terms "substantially" and "approximately" provides an industry-accepted tolerance for its corresponding term and/or relativity between items. Such an industry-accepted tolerance ranges from less than one percent to fifty percent. Such relativity between items ranges from a difference of a few percent to magnitude differences. As may also be used herein, the term(s) "coupled" and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more corresponding functions and may further include inferred coupling to one or more other items.

The embodiments of the present invention have been described above with the aid of functional building blocks illustrating the performance of certain functions. The boundaries of these functional building blocks have been arbitrarily defined for convenience of description. Alternate boundaries could be defined as long as the certain functions are appropriately performed. One of ordinary skill in the art may also recognize that the functional building blocks, and other illustrative blocks, modules and components herein, may be implemented as illustrated or by discrete components, application specific integrated circuits, processors executing appropriate software and the like or any combination thereof.

I claim:

1. A method comprising:
  generating a plurality of directional beacons from a single access point device, in which respective beacons of the plurality of directional beacons have unique Service Set identifiers or Media Access Control addresses to differentiate one directional beacon from other directional beacons;
  transmitting the plurality of directional beacons from the single access point device in respective different directions over a mapping boundary;
  receiving the plurality of directional beacons at a mobile device;
  determining respective received signal parameters for the plurality of directional beacons received by the mobile device based on receive signal strength (RSS), time of arrival (TOA), time difference of arrival (TDOA), and angle of arrival (AOA) of the plurality of directional beacons;
  accessing, from a database of the mobile device, a mapping of previously measured signal parameters of the plurality of directional beacons for the mapping boundary; and
  using the respective received signal parameters by the mobile device to locate its position on the mapping of the previously measured signal parameters of the plurality of directional beacons.

2. The method of claim 1, wherein when transmitting the plurality of directional beacons, the directional beacons are transmitted using a wireless local access network protocol.

3. The method of claim 2, wherein when transmitting the plurality of directional beacons, the directional beacons are transmitted using 802.11 protocol.

4. The method of claim 2, wherein when transmitting the plurality of directional beacons, the directional beacons are transmitted at a frequency in a 2.4 GHz, 5 GHz or 60 GHz band.

5. The method of claim 2, wherein when generating the plurality of beacons, the respective unique Service Set identifiers or Media Access Control addresses differentiate the directional beacons to operate as separate virtual networks.

6. The method of claim 1, further comprising determining the mapping based upon input from at least one mobile device.

7. The method of claim 1, further comprising transmitting the mapping to the mobile device.

8. A method comprising:
generating a plurality of directional beacons from a single access point device, in which respective beacons of the plurality of directional beacons have unique Service Set identifiers or Media Access Control addresses to differentiate one directional beacon from other directional beacons; and
transmitting the plurality of directional beacons from the single access point device in respective different directions over a mapping boundary to support a mobile device in:
receiving the plurality of directional beacons;
determining respective received signal parameters for the plurality of directional beacons based on receive signal strength (RSS), time of arrival (TOA) of the directional beacon, time difference of arrival (TDOA), and angle of arrival (AOA) of the plurality of directional beacons;
accessing, from a memory of the mobile device, a mapping of previously measured signal parameters of the plurality of directional beacons for the mapping boundary; and
using the respective received signal parameters to locate its position on the mapping of the previously measured signal parameters of the plurality of directional beacons.

9. The method of claim 8, wherein when transmitting the plurality of directional beacons, the directional beacons are transmitted using a wireless local access network protocol.

10. The method of claim 9, wherein when transmitting the plurality of directional beacons, the directional beacons are transmitted using 802.11 protocol.

11. The method of claim 9, wherein when transmitting the plurality of directional beacons, the directional beacons are transmitted at a frequency in a 2.4 GHz, 5 GHz or 60 GHz band.

12. The method of claim 9, wherein when generating the plurality of beacons, respective unique Service Set identifiers or Media Access Control addresses differentiate the directional beacons to operate as separate virtual networks.

13. The method of claim 8 further comprising generating a second plurality of directional beacons from a second access point device, in which respective directional beacons of the second plurality of directional beacons also have unique identifiers to differentiate one directional beacon from other directional beacons; and
transmitting the second plurality of directional beacons of the second access point device in a different direction from other directional beacons of the second access point device, such that when the mobile device receives at least one transmitted directional beacon of the second access point device, the mobile device uses directional beacons from both the first and second access points to locate the position of the mobile device.

14. The method of claim 8, further comprising transmitting the mapping to the mobile device.

15. An apparatus comprising:
a baseband module of an access point device configured to generate unique identifiers including Service Set identifiers or Media Access Control addresses for respective directional beacons of a plurality of directional beacons to differentiate one directional beacon from other directional beacons;
a transmitter of the access point device coupled to the baseband module configured to generate the directional beacons at a radio frequency; and
a directional antenna of the access point device coupled to the transmitter to transmit the directional beacons in respective different directions over a mapping boundary to support a mobile device in:
receiving the plurality of directional beacons;
determining respective received signal parameters for the plurality of directional beacons based on receive signal strength (RSS), time of arrival (TOA) of the directional beacon, time difference of arrival (TDOA), and angle of arrival (AOA) of the plurality of directional beacons;
accessing, from a memory of the mobile device, a mapping of previously measured signal parameters of the plurality of directional beacons for the mapping boundary; and
using the respective received signal parameters to locate its position on the mapping of the previously measured signal parameters of the plurality of directional beacons.

16. The apparatus of claim 15, wherein the transmitter transmits the directional beacons using a wireless local access network protocol.

17. The apparatus of claim 15, wherein the transmitter transmits the directional beacons using 802.11 protocol.

18. The apparatus of claim 15, wherein the plurality of directional beacons provide for a propagation pattern that covers the mapping boundary.

19. The apparatus of claim 15, wherein at least some of the baseband module, the transmitter, and the directional antenna are configured to determine the mapping.

20. The apparatus of claim 15, wherein at least some of the baseband module, the transmitter, and the directional antenna are configured to transmit the mapping to the mobile device.

* * * * *